Nov. 22, 1949   L. B. HIMMEL ET AL   2,489,135
HIGH-FREQUENCY DIELECTRIC HEATING APPARATUS
Filed Oct. 7, 1946   2 Sheets-Sheet 1

Inventors:
Loran B. Himmel
Ruth V. Bush
By Greek Wells
Attorney

Nov. 22, 1949     L. B. HIMMEL ET AL     2,489,135
HIGH-FREQUENCY DIELECTRIC HEATING APPARATUS
Filed Oct. 7, 1946     2 Sheets-Sheet 2
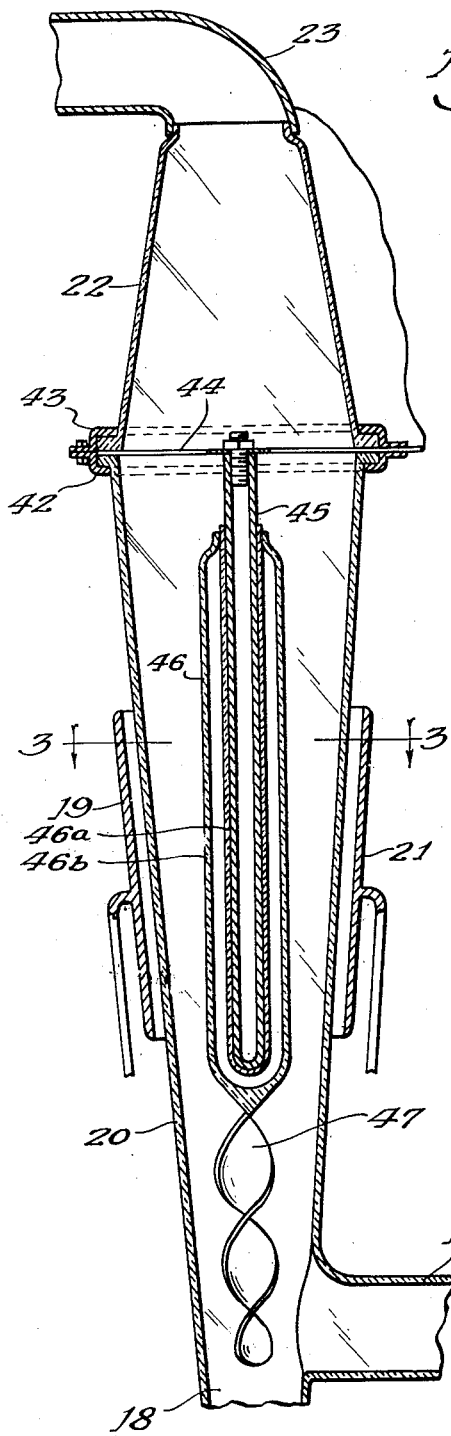
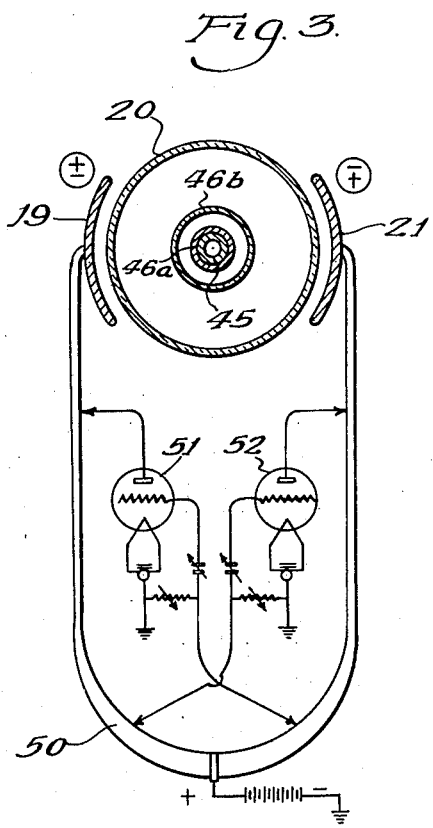
Inventors:
Loran B. Himmel
Ruth V. Bush
By Greek Wells
Attorney Patented Nov. 22, 1949

2,489,135

UNITED STATES PATENT OFFICE 2,489,135

HIGH-FREQUENCY DIELECTRIC HEATING APPARATUS

Loran B. Himmel and Ruth V. Bush, Des Moines, Iowa, assignors, by mesne assignments, to Ross M. Carrell Application October 7, 1946, Serial No. 701,840

5 Claims. (Cl. 219—47)

The present invention relates to apparatus for the activation of materials by application of electrical energy at high frequency. It is particularly of advantage in the so-called dielectric high frequency heating where internal heat is to be applied to a material that is being moved through the field of application in a fluid medium such as a gas for the purpose of roasting, dehydration or distillation.

It is the principal purpose of this invention to provide apparatus of the nature referred to, whereby the efficiency of treatment is enhanced greatly and the material undergoing treatment may be subjected to internal activation by high potentials at frequencies in the range of 10 megacycles and higher, in such fashion that other treatment such as heating externally, cooling externally, ionization, irradiation, reduction, oxidation, etc., may be carried on at the same time.

Another purpose of my invention is to provide a novel apparatus whereby loose particles of material including cereal grains, coffee beans, chopped vegetation, seeds, etc., may be continuously, or intermittently processed in the dielectric field and the products resulting separated in a desired manner.

The nature and advantages of the invention will appear more fully from the following description and the accompanying drawings illustrating one preferred embodiment of the invention. It should be understood, however, that the drawings and description are illustrative only, and are not to be considered as limiting the invention except insofar as it is limited by the claims.

In the drawings:

Figure 2 is an enlarged sectional view taken through the reaction chamber where the high frequency dielectric activation is carried out; and Figure 3 is a sectional view taken on the line 3—3 of Figure 2, showing the necessary electrical connections.

Figure 1:
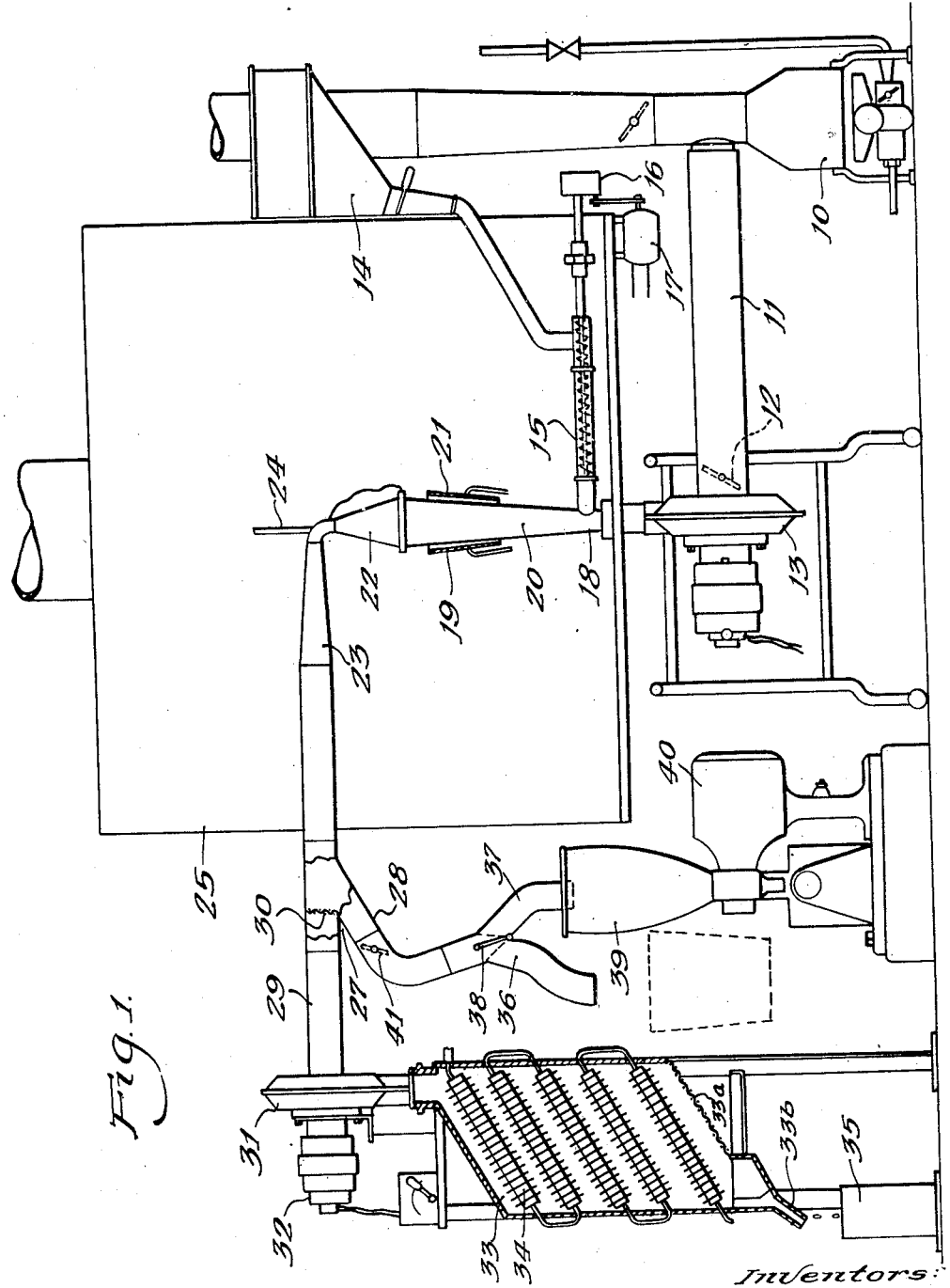
Figure 1 is a diagrammatic view of a system embodying the invention with the necessary auxiliary equipment for a roasting operation.

Referring now to the drawings, the showing in Figure 1 is intended to illustrate diagrammatically an apparatus by which the roasting process or dehydrating process may be carried out in accordance with this invention. The apparatus shown is adapted to use a heated gas in combination with the dielectric treatment, the gas being substantially devoid of oxygen so as to avoid danger of explosion in the reaction chamber.

A combustion chamber is shown at 10, hot gases being drawn from the chamber 10 through a conduit 11 having a control damper 12 therein, to a blower 13. The material to be treated is drawn from a hopper 14 to a feed screw conduit 15, which is driven through a suitable speed reduction unit 16 by a motor 17. The feed screw delivers its material into a conduit 18 which is the outlet from the blower 13. The material is thus intermingled with the hot gases, and fed into a reaction chamber 20 which expands upwardly as shown, and which has electrodes 19 and 21 associated therewith. The reaction chamber 20 has a hopper portion 22 which gradually reduces in diameter and empties into a discharge conduit 23. If desired, a measuring instrument 24, such as a thermometer, may be applied in the upper portion of the part 22. The entire reaction unit, consisting of the chamber 20 and the associated parts, is preferably housed in a cage 25 as a safety measure.

The conduit 23 is divided at 27 provided a lower discharge conduit 28 for the solid materials, and an upper conduit 29 for the vapors and gases. A screen 30 may desirably be placed in the conduit 29. A suction blower 31 is utilized to draw off the gases and vapor products. This blower is driven by a motor 32 and discharges downwardly into a condenser 33 having the usual finned coils 34, and suitable connections for circulating a cooling fluid through them. The condensate is drained off and collected in a receiver 35. The conduit 28 may, if desired, be divided as indicated at 36 and 37, one outlet 36 being merely a test outlet with a divider 38 to temporarily direct material to the test outlet. The other outlet 37 leads to the hopper 39 of a grinder 40 or other unit for subsequent treatment of the material. A damper 41 is installed in the conduit 28 for controlling the outlet of materials.

Referring now to Figures 2 and 3, these figures illustrate the reaction unit by which the high frequency dielectric activation is carried out. The chamber 20 preferably is constructed of such material as Pyrex glass or quartz, and expands outwardly from the conduit 18. This chamber 20 is joined to the converging chamber 22 by clamp rings 42 and 43, and a spider 44 is supported between the chambers 20 and 22. This spider 44 serves to support a central grounded electrode 45, the ground connection being to the conduit 23 or desirably to any other suitably grounded part of the apparatus. The central electrode may be of any suitable material, preferably however it is tubular in construction because of the high frequency used, and made of some such material as silver, or silver-plated brass, in order that the large currents on the electrode will have adequate surface on which to be carried away. Within the reaction chamber 20 electrode 45 is enclosed in an insulating shell 46 that is provided with a spiral extension 47 in the form of a flat twisted strip, the function of which is to give a rotative action to the incoming gas and material. This rotative action may be enhanced further by having the feed conduit 15 so arranged as to feed the material tangentially into the conduit 18.

In operation, the material to be treated is fed into the conduit 18 in sufficient quantities to cause the individual particles of the material to bunch together, and be lifted by the hot gases from the blower. The resultant effect has been found to be a distribution of the materials being treated into a loose spiral rope-like column rising through the reaction chamber 20 and circulating and re-circulating about the central electrode 45, scrubbing against the wall of the chamber 20 as the material rises in the process. This spiral action brings the material uniformly into the field between the outer electrodes and the central electrode so that all particles have sufficient opportunity to achieve an effective uniformity of absorption of the activating forces. The large quantity of material in proportion to the air keeps the air from driving the relatively lighter particles in the mass through the chamber too rapidly for effective treatment, and in the case of a roasting process, permits the necessary external heating of the particles to take place. The particles do not travel entirely through the reaction chamber without falling back. They tend to rise to the upper portion of the electrode 45, and above it, and then to fall back again within the field of the electrodes, so that to a certain extent repeated high frequency field activation takes place. This is particularly true where such materials as coffee beans are being roasted, because the beans are of such uneven shapes and sizes, and the resultant product thus gets a more uniform treatment. The bean which has not been full roasted will of course, be heavier than the other beans which has been fully roasted, and the heavier beans will thus tend to fall back into the reaction zone and remain longer in the chamber 20, getting a more complete roasting than would otherwise be the case. The spiral action of the materials insures the travel of all particles across the field. The upwardly expanding chamber 20 serves to provide adequate cross-section of space, sufficiently to decrease the force of the air tending to lift the particles to cause the action just described. It will be appreciated that the particles when heated, expand and have less specific gravity. Without the particular upwardly expanding chamber 20 and upwardly decreasing chamber 22 the desired action could not be obtained, since the particles upon entering the activation zone would expand and the air expands too because of its rise in temperature. In a reaction chamber of constant cross section the velocity of flow would have to increase from the inlet to the outlet because of this expansion. The spiral flow and the selective falling back of the heavier beans can only be accomplished by combining the chambers defined with the activation means.

The scrubbing action which results from the spiral flow of the particles through the chamber 20 is particularly useful in keeping the surface of the chamber clean. In most of these reactions, volatile materials such as oils and certain resins are driven off that tend to collect upon the wall of the chamber 20. If such depositions were permitted to form encrustations in the H. F. region, they would rapidly fire and wreck the walls of the vessel. The scrubbing action, however, effectively removes these materials so that they are carried out of the chambers 20 and 22.

In connection with Figure 3 of the drawings, the excitation circuit supplying the high frequency for the treatment of the materials in the chamber 20 is illustrated diagrammatically. This circuit comprises a quarter wave generator of the general character described and claimed in the application of Loran B. Himmel, Serial No. 605,394, filed July 16, 1945, now Patent Number 2,474,420, dated June 28, 1949, wherein a tank coil 50 is powered by two oscillator tubes 51 and 52 connected as shown, the load being placed at the ends of the tank coil and the base of the tank coil being connected to a source of high potential as shown. The central electrode 45 is grounded so that in the circuit the load (the material within the chamber 20) is subjected to maximum system voltages from both of the external electrodes 19 and 21 discharging to the grounded central electrode. The charges at any instant are as shown, of opposite polarity from the two electrodes.

This apparatus is not limited in its use to any particular treatment or material. Its function is the application of high frequency potentials to the material for the purpose of obtaining certain effects in the material. For example it may be used to drive out certain constituents of a material from others, such as separation of volatile oils from solids, the separation of one oil of a certain phase from another, and the removal of water or other volatile materials from a solid or other liquid. The apparatus may be used to effect a change in the nature of the products treated by initiating a chemical reaction, or it may be used for heating a product where heat is the main net end desired. In effect the apparatus may accomplish any one of the above treatments or a combination of them.

The dielectric activation may be selectively internal or localized or both in its effects, so that it may be used in combination with other treatments, such as external heating or cooling, oxidation or reduction of the product. It may be applied to liquid or to dry materials, and it may be used in combination with wave treatments such as ultra violet, infra-red, X-rays and the like. The apparatus as shown is constructed to utilize such light-wave spectra in combination with the dielectric activation. One way is accomplished by making the glass envelope 46 a double walled chamber having an inner glass envelope 46a and an outer glass envelope 46b, the space between being filled with ionizing gas such as mercury vapor under suitable pressure. The high frequency employed for the dielectric activation will simultaneously supply energy to the aforesaid vapor chamber, so that it in turn, will give off rays of the desired specific wavelength.

It is believed that the nature and advantages of the invention will be clear to those skilled in the art, from the foregoing description.

Having thus described our invention, we claim:

1. Apparatus for applying high frequency high potential electrical energy to a material comprising in combination, an upright tubular chamber, increasing in cross-section from its lower end to its upper end, a spiral director member in the lower end of the chamber, means directing a gaseous fluid upwardly in said chamber, means to introduce solid particles into said chamber, a central electrode extending upwardly in the chamber from said spiral member, said chamber having its outer wall of dielectric material, electrodes immediately outside said chamber, a ground connection to the central electrode and means to apply high frequency potentials to said outside electrodes.

2. Apparatus for applying high frequency, high potential electrical energy to solid particles comprising in combination, an upright hollow, inverted, frusto-conical vessel of dielectric material, a tube of dielectric material centrally disposed in said vessel, an electrode in said tube, having a lead to the exterior of the vessel, a second frusto-conical vessel seated on the first vessel and having a top outlet, a curved electrode closely adjacent to the outer surface of the lower vessel, means to impress a high frequency electric potential across said electrodes, means directing a stream of gaseous fluid upwardly through said vessels, and means to feed solid particles to be treated into the stream of gaseous fluid.

3. Apparatus for applying high frequency, high potential electrical energy to solid particles comprising in combination, an upright hollow, inverted frusto-conical vessel of dielectric material, a tube of dielectric material centrally disposed in said vessel, a spiral vane extending downwardly from the lower end of said tube, an electrode in said tube having a lead to the exterior of the vessel, a second frusto-conical vessel seated on the first vessel and having a top outlet, a curved electrode closely adjacent to the outer surface of the lower vessel, means to impress a high frequency electric potential across said electrodes, means directing a stream of gaseous fluid upwardly through said vessels, and means to feed solid particles to be treated into the stream of gaseous fluid.

4. Apparatus for applying high frequency, high potential electrical energy to solid particles comprising in combination, an upright hollow, inverted frusto-conical vessel of dielectric material, a tube of dielectric material centrally disposed in said vessel, an electrode in said tube having a lead to the exterior of the vessel, a second frusto-conical vessel seated on the first vessel and having a top outlet, a pair of electrodes diametrically opposite each other and opposite said tube, outside the lower vessel, and in close juxtaposition thereto, the electrode in the tube being grounded, means to impress high frequency electric potentials of opposite sign on the pair of electrodes outside the lower vessel, means directing a stream of fluid upwardly through the vessels and means to feed solid particles to be treated into said stream.

5. Apparatus for applying high frequency, high potential electrical energy to solid particles comprising in combination, an upright hollow, inverted frusto-conical vessel of dielectric material, a tube of dielectric material centrally disposed in said vessel, an electrode in said tube having a lead to the exterior of the vessel, a second frusto-conical vessel seated on the first vessel and having a top outlet, a curved electrode closely adjacent to the outer surface of the lower vessel, means to impress a high frequency electric potential across said electrodes, means directing a stream of gaseous fluid upwardly through said vessels, and means to feed solid particles to be treated into the stream of gaseous fluid, said tube having an ionizable gas filling therein around the electrode.

LORAN B. HIMMEL.
RUTH V. BUSH.

REFERENCES CITED

The following references are of record in the file of this patent:

UNITED STATES PATENTS

| Number | Name | Date |
| --- | --- | --- |
| 1,871,688 | Heller | Aug. 16, 1932 |
| 1,934,703 | Golden | Nov. 14, 1933 |
| 1,972,050 | Davis | Aug. 28, 1934 |
| 2,054,273 | Subkow | Sept. 15, 1936 |
| 2,163,898 | Van Der Lande | June 27, 1939 |
| 2,188,625 | Dufour et al. | Jan. 30, 1940 |
| 2,231,457 | Stephen | Feb. 11, 1941 |
| 2,279,361 | Amstuz | Apr. 14, 1942 |
| 2,364,940 | Bies | Dec. 12, 1944 |
| 2,385,567 | Descarsin | Sept. 25, 1945 |
| 2,404,474 | Collins | July 23, 1946 |